(12) United States Patent
Bentley et al.

(10) Patent No.: US 9,167,090 B2
(45) Date of Patent: Oct. 20, 2015

(54) PUBLIC SAFETY ANSWERING POINT LANGUAGE DETECTION

(71) Applicant: Avaya Inc., Basking Ridge, NJ (US)

(72) Inventors: Jon Bentley, New Providence, NJ (US); Mark Fletcher, Ringwood, NJ (US); Joseph L. Hall, Basking Ridge, NJ (US); Avram Levi, Hoboken, NJ (US); Paul Roller Michaelis, Louisville, CO (US); Heinz Teutsch, Green Brook, NJ (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/846,243

(22) Filed: Mar. 18, 2013

(65) Prior Publication Data

US 2014/0270144 A1    Sep. 18, 2014

(51) Int. Cl.
*H04M 3/51*      (2006.01)
*H04M 3/523*     (2006.01)

(52) U.S. Cl.
CPC .... *H04M 3/5116* (2013.01); *H04M 2203/2061* (2013.01); *H04M 2242/04* (2013.01)

(58) Field of Classification Search
CPC . H04M 3/523; H04M 3/5233; H04M 3/5116; H04M 11/04; H04M 3/50; H04M 2203/2061; H04M 2242/12; H04M 2250/58; H04M 2242/04

USPC .......... 379/45, 88.05, 88.06, 265.01, 265.02, 379/265.07, 265.09, 265.11–265.13
See application file for complete search history.

(56) References Cited

U.S. PATENT DOCUMENTS

| | | | |
|---|---|---|---|
| 6,690,932 B1 * | 2/2004 | Barnier et al. | 455/414.1 |
| 2007/0071181 A1 * | 3/2007 | Hwang | 379/45 |
| 2010/0262668 A1 * | 10/2010 | Piett et al. | 709/206 |
| 2011/0255683 A1 | 10/2011 | Flockhart et al. | |
| 2012/0190324 A1 | 7/2012 | Hatton et al. | |

OTHER PUBLICATIONS

U.S. Appl. No. 13/832,741; Method, Apparatus, and System for Providing Real-Time Call Analysis, filed Mar. 15, 2013; Application will not be included in this filing.
Language Identification Chart, www.headstartresourcecenter.org/assets/files/_NCCLR_High-Quality_Translation_Handout_2.pdf, Refugee Council.

* cited by examiner

*Primary Examiner* — Harry S Hong
(74) *Attorney, Agent, or Firm* — Sheridan Ross P.C.

(57) ABSTRACT

A Public Safety Answering Point (PSAP) is disclosed. The PSAP is configured to enable the detection of language preferences, capabilities, or inabilities and, based on such detection, assist the PSAP agent in assisting the PSAP caller. The PSAP may additionally or alternatively utilize the detection of language information to assist in the decision to route or re-route the PSAP caller to appropriate PSAP resources.

20 Claims, 4 Drawing Sheets

PUBLIC SAFETY ANSWERING POINT LANGUAGE DETECTION

FIELD OF THE DISCLOSURE

The present disclosure is generally directed toward communications and more specifically toward contact centers.

BACKGROUND

Contact centers are often used to direct customer escalations (e.g., contacts) to various contact center resources (e.g., agents) based on a determination of the customer's question(s), the customer's needs, the availability of agents, the skills of agents, and so on. One specific type of contact center is known as a Public Safety Answering Point (PSAP) or E911 contact center.

PSAPs experience many unique problems not often encountered in a traditional contact center, usually because each contact in a PSAP is associated with an emergency. One problem that is more commonly experienced by PSAPs as compared to traditional contact centers is that the opportunity of language mismatches is heightened. Specifically, most traditional contact centers will first take a customer through an Interactive Voice Response (IVR) script during which language preferences/requirements of the customer can be ascertained. Usually by the time the customer has finished interacting with the IVR, the customer's language preferences/requirements are determined and the customer can be assigned to an appropriate agent. PSAPs, on the other hand, forego the IVR script and connect the caller with an agent as quickly as possible. As can be expected, if the caller and agent do not speak the same language, or if the agent is not capable of understanding the language spoken by the caller, then serious problems can arise.

Similar problems can arise if the caller is unable to speak intelligibly in any language. For instance, if the caller has suffered a stroke and is unable to speak intelligibly, then it will be very difficult to understand the caller, regardless of language preferences. As another example, if the caller is in a situation where they cannot speak for fear of endangering themselves, then there will be no opportunity to interact with the caller verbally.

SUMMARY

It is with respect to the above issues and other problems that the embodiments presented herein were contemplated. This disclosure proposes, among other things, the ability to allow an agent to invoke a language assessment module at their work station and, during their interaction with a caller, determine the caller's language preferences and/or language requirements with the help of the language assessment module. In particular, if during an interaction an agent is unable to understand a caller, then the agent may be allowed to interact with a language assessment module via a language assessment interface on their workstation. The language assessment interface may enable the agent to begin a language analysis.

In some embodiments, the language analysis may be capable of determining, in an automated or semi-automated fashion, the customer's language preferences and/or requirements. Alternatively or additionally, the language analysis may also be capable of determining if the caller is unable to speak for any reason (e.g., threat of danger, injury, disability, etc.). Any or all of these determinations may be analyzed by the agent and/or the language assessment module to determine an optimal plan for servicing the caller. Furthermore, the originally-assigned agent may be provided with one or more automated tools that enable the agent to communicate with the caller.

Most PSAPs in the United States operate under the assumption that the caller both understands and speaks English, is aware of a problem, and calls the PSAP to report that problem. Unfortunately, that is not true in every case for every emergency call. Rather than always having someone available who knows the language or relying on a translation service, tools and methods of the present disclosure can address the language issue quickly and efficiently without dependence on translators or translation services.

Embodiments of the present disclosure propose a system used by an agent where there is a button on the agent workstation interface displayed during the call that sends the message, "It seems that I am communicating with a caller, but I cannot understand the caller." At that point, a large part of the screen can be devoted to tools that assist the agent in determining the language issue: is the caller speaking a foreign language (and if so, which one), is the caller suffering from a speech deficit, etc.

Linguists indicate that at least one of the top five languages in the world is spoken by 60% of the world's population, and that over 97% of the world's population speak at least one of the top twenty languages (in many regions of the world, people speak a local language at home and a more frequently-used language for commerce). One aspect of the present disclosure is to enable an agent to work together with the language assessment module to identify the language preferences/requirements for a caller.

The simplest approach to this problem is to use a sequential search that plays a series of statements such as "Say 'English' or press 5 if you speak English," and similar statements for and in other languages. These systems may employ a fixed prior probability distribution of languages to order the phrases optimally. It could be useful to separate the upstream and downstream audio components for automated processing.

Embodiments of the present disclosure propose the ability to augment the language search described above with additional information, including one or more of the following:

LOCATION CLUES. In some cities, a majority of non-English calls might be in one common second language (perhaps Spanish in southern Texas municipalities or French in northern Maine). Information might also be gleaned from caller ID. The search can be re-ordered as a function of local statistics. If the Caller ID (ANI) identifies the location of the caller as Chinatown, then Mandarin might be high on the list with Cantonese second, and rules could be used similarly for other municipalities.

NAME CLUES. If the Caller ID (ANI) identifies the last name as "Yamamoto," the search might start with Japanese, while the last name "Singh" or "Kaur" might encourage the search to start at Punjabi.

PHONETIC CLUES. Groups of languages typically share phonetic characteristics; linguists use the term "sprachbund" to describe a linguistic group of related tongues. Many people who do not know a language might still be able to guess whether particular speech is "Northern European," "Eastern European," or "East Asian." This input could be sought from the agent. Samples could be made available of common languages in the area, so the agent could refresh his or her memory during the conversation.

HISTORY. Typical Computer Aided Dispatch (CAD) systems keep a database of all emergency calls. A field could be added to capture the language of the caller or to identify speech impairments. This would increase the prior estimate of the probability that future calls from that number might be in that language or have the same challenges. The probable language concept could be expanded to a geographic cluster or region and used as an indicator that neighbors might also speak the same language.

AUTOMATED ANALYSES. With sufficient computational power, a system can employ tools for "Spoken Language Identification." Absent identification tools, existing translation tools could be used to estimate the probability that the input language is the translated language. These operations could be conducted in parallel or in the cloud. The search could be ordered to start with the most likely language given available clues.

In accordance with at least some embodiments, some or all of these information sources can be merged to estimate the probabilities for the various languages. Once merged, the information can be searched by the language assessment module and the probabilities obtained from the merged information can used to order or prioritize the languages that are tested by the language assessment module.

In addition to distinct languages, the language assessment module may be configured to query or search for impairments as well. For instance, the following prompt could be played to a caller that is either unintelligible or not interacting verbally with the agent: "If you can understand this but cannot speak, please press 8 now." This would be particularly useful for emergency callers suffering aphasia secondary to stroke or who have received injuries in or near the vocal tract. Once the search has found a plausible answer, it can automatically confirm it ("We believe you speak Spanish; say 'si' to confirm this." in that language, or "If you are injured and cannot speak clearly, press 7").

Embodiments of the present disclosure also propose the ability to invoke additional routing or agent selection processes if the originally-selected agent is still incapable of handling the call by themselves. For instance, the caller may be transferred or conference with a different agent having the appropriate language abilities. Additionally or alternatively, the originally-selected agent may be provided with one or more automated tools to help them service the call.

It is another aspect of the present disclosure to leverage the ability of a mobile device (e.g., smartphone) to send real-time data with the call in a Presence Information Data Format-Location Object (PIDF-LO). These types of objects may one or more of the following information fields in a header that includes a language preference indicator: contact element, timestamp, status, and a tuple umbrella element. This language preference indicator could be compared to a PSAP's language indicator for all currently-available agents, and a routing or re-routing decision could be made based on the indicator. In other embodiments, a real-time translation program could be administered to assist the selected agent in understanding the caller.

Another aspect of the present disclosure comprises sending one or more images to a caller's mobile device (e.g., smartphone), where each image represents a query in a variety of likely languages based on the information described above. An example of such an image can be found at www.headstartresourcecenter.org/assets/files/_NCCLR_High-Quality_Translation_Handout_2.pdf, the entire contents of which are hereby incorporated herein by reference.

Another aspect of the present disclosure is to provide one or more pre-recorded soothing and/or information messages in the determined language (e.g., once confirmed) to help to calm the caller while waiting for a translator. As a non-limiting example, if gun shots are heard in the background and the caller's preferred language can be deduced as being Greek, then a prerecorded message can be provided to the caller such as "stay down and stay calm—help is on the way." Soothing may help to keep the caller calm enough to follow the useful information that is provided.

In accordance with at least some embodiments of the present disclosure, the language information gleaned from this process could first be used by the agent to facilitate communications with the caller. The information could additionally or alternatively be forwarded to first responders. The determined language information can be provided to first responders from the PSAP. When the first responders receive the determined language information, the first responders may be enabled to take actions ranging from getting out a Spanish phrase sheet and reviewing it in the minutes they are driving to the scene to starting an appropriate translation application on a mobile device.

In accordance with at least some embodiments, a method of servicing an emergency contact in a Public Safety Answering Point (PSAP) is disclosed that comprises:

receiving a contact from a caller and generating a corresponding work item to represent the contact in the PSAP;

assigning the work item to a first PSAP agent;

during an interaction between the first PSAP agent and caller, determining that at least one of a language preference and requirement of the caller is unmet by the first PSAP agent; and enabling the first PSAP agent to invoke a language assessment module, the language assessment module providing the first PSAP agent with one or more tools to determine the at least one of a language preference and requirement of the caller.

The term "caller" as used herein can be construed to include a person or customer that has escalated a contact in a contact center. A caller can include a customer that has escalated a voice call, a video call, a web call, a chat, text message, email, or combinations thereof. Moreover, while embodiments of the present disclosure will describe a caller as being a person reporting an emergency to a PSAP, it should be appreciate that embodiments of the present disclosure are not so limited and the language assessment systems and methods described herein can be utilized in non-emergency contact centers, enterprise contact centers, and the like.

The term "agent" or "PSAP agent" can be construed to include one or more human agents operating one or more contact center endpoints or workstations. In some embodiments, an agent may correspond to a contact center supervisor, a trainee, or an agent. An agent may process a work item with or without the assistance of an automated processing resource. For instance, an automated system may be configured to generate proposed responses to work items or questions within work items. An agent may be allowed to select which among the automatically-generated responses are the best response and/or edit one of the automatically-generated responses. Accordingly, it may be possible that an agent is considered to be "processing" a work item when, in fact, an automated resource is being used to assist the agent in the processing of the work item.

The term "language requirement" or "language preference" may be understood to include spoken language preferences, unspoken language preferences (e.g., sign language, TTY requirements, etc.), and/or the inability to communicate with any language (e.g., due to disability, injury, fear of speaking, etc.). Accordingly, a caller's "language requirement" may be determined to be a lack of ability to speak, as opposed to being determined to be a specific language.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It is understood that various changes may be made in the function and arrangement of elements without departing from the spirit and scope of the appended claims.

Furthermore, while embodiments of the present disclosure will be described in connection with PSAP examples, it should be appreciated that embodiments of the present disclosure are not so limited. In particular, embodiments of the present disclosure can be applied to any contact center construct and, in some embodiments, may also be utilized in non-contact center settings. For instance, any communication scenario involving or requiring the need to determine a communicant's speaking and/or language abilities may utilize the embodiments described herein. The usage of PSAP examples is for illustrative purposes only and should not be construed as limiting the claims.

Figure 1:
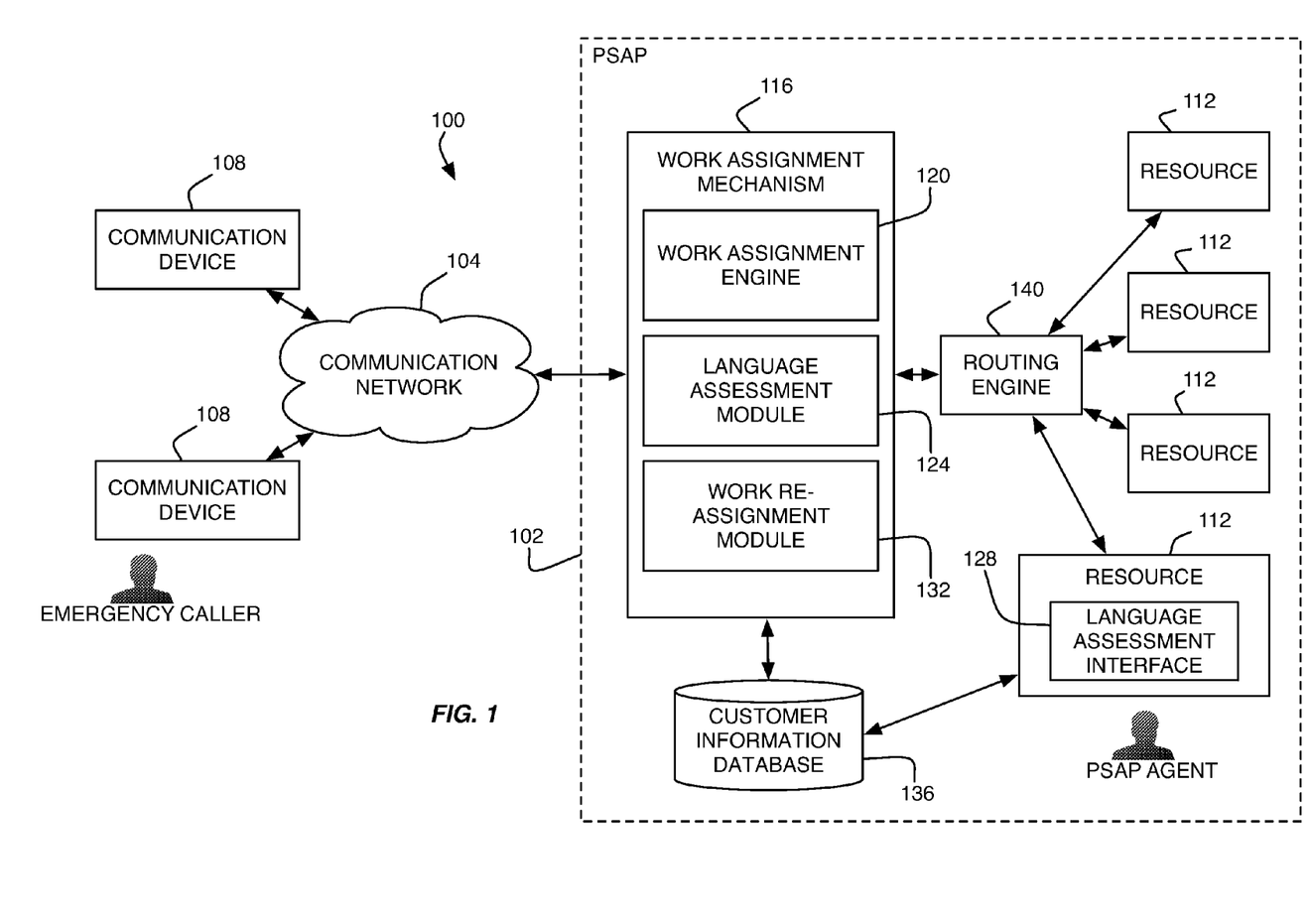
FIG. 1 is a block diagram of a communication system in accordance with embodiments of the present disclosure.

FIG. 1 shows an illustrative embodiment of a communication system 100 in accordance with at least some embodiments of the present disclosure. The communication system 100 may be a distributed system and, in some embodiments, comprises a communication network 104 connecting one or more communication devices 108 to a contact center, such as a PSAP 102. In some embodiments the PSAP 102 includes a work assignment mechanism 116, which may be owned and operated by an enterprise or government agency administering a contact center in which a plurality of resources 112 are distributed to handle work items (in the form of contacts) from the communication devices 108.

In accordance with at least some embodiments of the present disclosure, the communication network 104 may comprise any type of known communication medium or collection of communication media and may use any type of protocols to transport messages or message fragments between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type, and instead may comprise a number of different networks and/or network types. Moreover, the communication network 104 may comprise a number of different communication media such as coaxial cable, copper cable/wire, fiber-optic cable, antennas for transmitting/receiving wireless messages, and combinations thereof.

The communication devices 108 may correspond to communication devices used by contact center callers. In the example of a PSAP 102, the caller utilizing the communication device 108 may correspond to an emergency caller. In accordance with at least some embodiments of the present disclosure, a customer may utilize their communication device 108 to initiate a work item, which is generally a request for a processing resource 112. Illustrative work items include, but are not limited to, a contact directed toward and received at a contact center, a web page request directed toward and received at a server farm (e.g., a collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof.

The format of the work item may depend upon the capabilities of the communication device 108 and the format of the communication. In some embodiments, work items are logical representations within a contact center (e.g., the work assignment mechanism 116 of the contact center) of work to be performed in connection with servicing a communication/contact received at the contact center. The communication or contact associated with a work item may be received and maintained at the work assignment mechanism 116, a switch or server connected to the work assignment mechanism 116, or the like until a resource 112 is assigned to the work item representing that communication at which point the work assignment mechanism 116 passes the work item to a routing engine 140 to connect the communication device 108 which initiated the communication with the assigned resource 112. The connection between the communication device 108 and a resource 112 may be effected by the routing engine 140 assigning one or more communication resources (e.g., sockets, buffers, physical ports, etc.) to establish a communication path (e.g., media stream such as RTP or SRTP) between the communication device 108 and resource 112. In some embodiments, the communication path established between the communication device 108 and resource 112 may also carry call control signaling, however, it may also be possible to maintain the signaling path at the work assignment mechanism 116. Alternatively, the communication device 108 may be initially connected to a conference bridge or the like by the routing engine 140 before any resource 112 is assigned to the contact. The work assignment mechanism 116 may later decide which resource(s) 112 are going to be assigned to the contact and, upon making such a decision, instruct the routing engine 140 to connect the selected resource(s) 112 to the conference bridge where the contact is being parked.

Although the routing engine 140 is depicted as being separate from the work assignment mechanism 116, the routing engine 140 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, tablet, Personal Digital Assistant (PDA), cellular phone, smart phone, telephone, or combinations thereof. In general each communication device 108 may be adapted to support video, audio, text, and/or data communications with other communication devices 108 as well as the processing resources 112. The medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 140. The resources 112 can either be completely automated resources (e.g., Interactive Voice Response (IVR) units, text-based menu provider units with a corresponding Dual-Tone Multi-Frequency (DTMF) response detection unit, Interactive Voice and Video Response (IVVR) units, processors, servers, or the like), human resources utilizing communication devices/work stations (e.g., human agents utilizing a computer, telephone, laptop, etc.), or any other resource known to be used in contact centers.

As discussed above, the work assignment mechanism 116 and resources 112 may be owned and operated by a common entity in a contact center format. In some embodiments, the work assignment mechanism 116 may be administered by multiple enterprises, each of which has their own dedicated resources 112 connected to the work assignment mechanism 116.

In some embodiments, the work assignment mechanism 116 comprises a work assignment engine 120 which enables the work assignment mechanism 116 to make intelligent routing decisions for work items. In some embodiments, the work assignment engine 120 is configured to administer and make work assignment decisions in a queueless contact center, as is described in U.S. Patent Application Serial No. 2011/0255683 filed Sep. 15, 2010, the entire contents of which are hereby incorporated herein by reference.

The work assignment engine 120 may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users.

As noted above, the work assignment engine 120 may comprise the functionality to initially assign work items to a selected resource 112. In some embodiments, the work assignment mechanism 116 may also include a work re-assignment module 132 and language assessment module 124. As will be described in further detail herein, the language assessment module 124 may be utilized to help an initially-selected resource 112 (e.g., first-selected agent) interact with a caller whose language and/or speaking abilities cannot be readily discerned by the first-selected agent. For example, the language assessment module 124 may enable the first-selected agent to determine language/speaking preferences and/or requirements for the caller and, if necessary, the work re-assignment module 132 may be configured to re-assign the work item (and the caller) to a different resource 112 that is better suited to handle the language/speaking preferences and/or requirements for the caller.

The initial assignment logic as represented by the work assignment engine 120 and re-assignment module 132, although depicted as being separate modules, may actually be combined into a single module. Moreover, one or both of the components 120, 132 do not necessarily need to be executed by the work assignment mechanism 116, but rather can be executed by any other component of combination of components depicted and described herein.

In some embodiments, the work assignment engine 120 is configured to make work assignment decisions for work items that have yet to be assigned to a resource 112 or agent. The work re-assignment module 132, on the other hand, may correspond to a module within the work assignment mechanism 116 that is capable of analyzing work items that have already been assigned to agents in response to a detection of language differences between the initially-selected agent and the caller.

In some embodiments, an agent's workstation may include a language assessment interface 128. The language assessment interface 128 may provide the means by which the agent can interact with the language assessment module 124. As one example, if an agent is having troubles communicating with a caller for any reason (e.g., due to the caller's inability to speak or due to the agent's inability to understand the words that are being spoken by the caller), the agent can utilize the language assessment interface 128 to invoke the language assessment module 124. In some embodiments, the language assessment interface 128 may also comprise a graphical user interface to the agent that enables the agent to assess language/speech preferences and/or requirements. The language assessment interface 128 may also provide an agent with a script for responding to and/or interacting with the customer until an analysis by the language assessment module 124 is complete and/or until another agent has been assigned to the call.

The language assessment interface 128 and/or language assessment module 124 may have access to call history information for customers via a customer information database 136. In some embodiments, the customer information database 136 may contain information describing historical interactions with a particular caller, how such interactions were resolved, historical language preferences for a caller, purchase history for a caller, and other information pertinent to a servicing a caller in the future.

Figure 2:
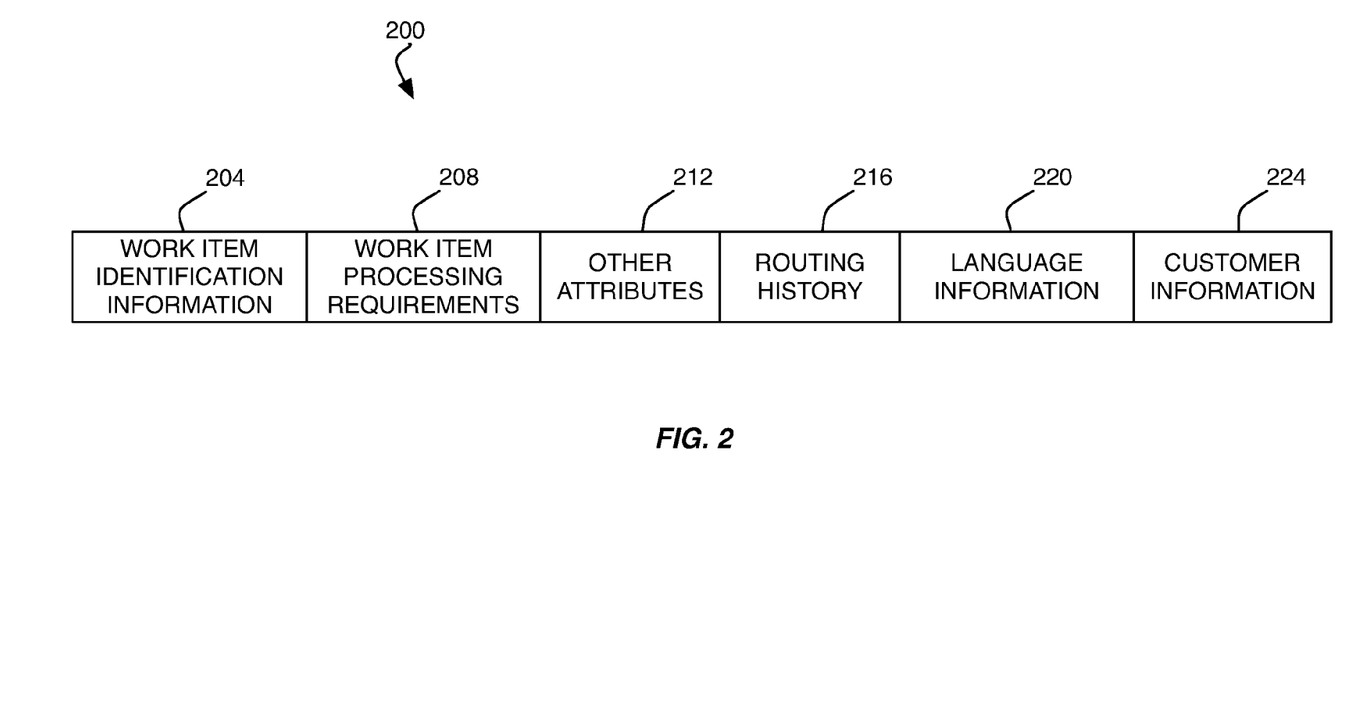
FIG. 2 is a block diagram depicting a data structure in accordance with embodiments of the present disclosure.

With reference now to FIG. 2, details of a data structure 200 will be described in accordance with embodiments of the present disclosure. In some embodiments, the data structure 200 can be used to further define attributes or metadata about work items in the contact center. The data structure 200 may be partially or completely stored in the customer information database 136, in memory of the work assignment mechanism 116, or in any other computer memory that is maintaining an instance of information for a caller. Examples of fields that may be provided in the data structure 200 include, without limitation, a work item identification information field 204, a work item processing requirements field 208, an attributes field 212, a routing history field 216, a language information field 220, and a customer information field 224.

In some embodiments, the work item identification information field 204 may comprise information that enables a unique identification of the work item within the contact center. For instance, a pseudo-randomly generated work item identification number may be contained in the work item identification information field. Other examples of identification information include, without limitation, work item ID numbers, customer ID information, work item status, and so on.

The work item processing requirements information field 208 may comprise any information that describes processing requirements specific to the work item. Examples of information that may be maintained in the work item processing requirements information field 308 include, without limitation, language requirements (known or assumed), media requirements (e.g., text, TTY, voice, video, chat, SMS, email, etc.), skill requirements (e.g., sales, product support, billing, expertise of particular skills, combinations thereof, etc.), time of response requirements (e.g., time that work item was created, current wait time, estimated wait time, quoted wait time, etc.), customer level (e.g., gold, platinum, regular, etc.), goals of servicing the work item, product or service related to work item, and so on.

The other attributes information field 212 may comprise information similar to the work item processing requirements, but the attributes information may not necessarily correspond to information used for assigning the work item to an agent. Examples of information that may be maintained in the other attributes information field 212 include information such as contact type, service level goals and whether such goals have or can been achieved, related work items (e.g., if a customer escalated multiple contacts), etc.

The routing history information field 216 may comprise information that describes where the work item has been routed within the contact center. For instance, if the work item is initially received at the work assignment engine 120 and then transferred to a first agent, the routing history field 216 would reflect that information. If the work item is subsequently re-assigned, transferred, or rerouted back to the work assignment engine 120 or to a second agent, that information would also be reflected in the routing history field 216. The routing history information field 216 may also contain information related to routing history of previous work items escalated by the same customer, thereby enabling the work assignment engine 120 to try and route subsequent work items from that customer back to the same agent.

The language information field 220 may contain any type of information that describes or enables a determination of a caller's language preference. For instance, if the caller is utilizing a phone capable of sending real-time data with the call (e.g., language information, presence information, location information, etc.), then any type of language information sent by the caller may be extracted and stored in the language information field 220. As other examples, any other information that may assist in the determination of language preferences for a caller may be stored in the language information field 220. Non-limiting examples of such information include: location clues, caller name clues, phonetic clues, customer history information, automated analysis information, combinations thereof, etc. In addition, any information that can be used to intelligently construct an automated language analysis by the language assessment module 124 could also be stored in the language information field 220. In some embodiments, any of the above-described language information (whether obtained directly from the caller, from the customer information database 136, or from some other source) may be merged to estimate the probabilities for various languages and the language search performed by the language assessment module 124 could be ordered based on those probabilities. As an example, if a caller is determined to have the following language probabilities based on known information (e.g., Spanish—40%, Italian—25%, Portuguese—15%, Greek—5%, and other—15%), then the language assessment module 124 may test the caller's language abilities in the following order: Spanish first, Italian second, Portuguese third, and Greek fourth. By ordering the language search according to determined language probabilities, the language assessment module 124 may be configured to determine language preferences for the caller more efficiently than if the search were not ordered.

The customer information field 224 may contain information describing the customer including currently-known customer information, information provided by the customer (e.g., by interaction with an IVR system), customer history information, and/or prospective customer information. The information in the customer information field 224 may be obtained from the customer, from the customer information database 136, from the Internet or social media feeds, or from any other source regardless of whether the source is internal or external to the contact center.

Figure 3:
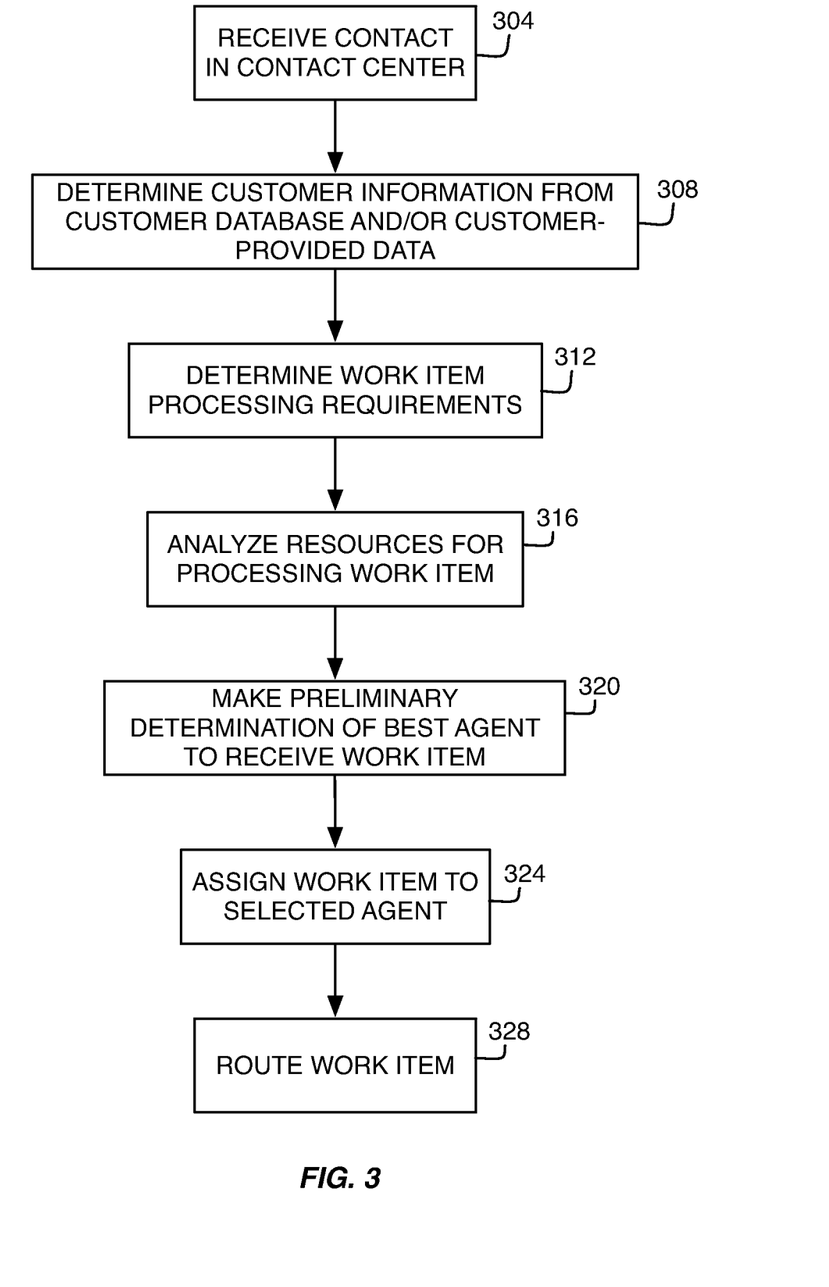
FIG. 3 is a flow diagram depicting a work item assignment method in accordance with embodiments of the present disclosure.

With reference now to FIG. 3, an illustrative method of initially assigning a work item in a contact center will be described in accordance with embodiments of the present disclosure. While the illustrative example will primarily reference an emergency caller that has escalated a real-time work item in a PSAP 102, it should be appreciated that the method disclosed herein is not so limited. Specifically, the embodiments described herein can be applied to PSAP and non-PSAP contact centers as well as real-time, near-real-time, and non-real-time contacts.

The method begins when a contact is received in the contact center (step 304). A work item is then generated within the work assignment mechanism 116 to represent that contact for the duration of the contact's life within the contact center.

Once the work item is generated, the method continues with the work assignment engine 120 determining customer information for the caller (step 308). In some embodiments, this step can include referencing the customer information database 136 to determine if any historical information is available for the caller. Alternatively or additionally, the caller may be routed to an IVR that is configured to extract certain basic information from the caller prior to making a work item routing decision. As can be appreciated, it may not always be feasible to route a customer through an IVR experience, especially in a PSAP 102 environment. Other information obtainable from the call itself (e.g., caller ID (ANI) information, PIDF-LO information describing language preferences, caller location information, any other information contained in a call header, etc.) may also be obtained during this step.

Based on the information obtained during step 308, the work assignment engine 120 is capable of making an initial determination of work item processing requirements for the work item (step 312). As can be appreciated, the work item processing requirements may attempt to satisfy initially-determined language preferences of the caller. However, if such information was unobtainable initially or no efforts were initially made to obtain such information, then the processing requirements may simply correspond dictate that the work item should be assigned to the next available agent, regardless of the agent's skills.

The work assignment engine 120 is then capable of analyzing the work item's processing requirements and comparing such requirements to processing capabilities of resources 112 in the contact center (step 316). As mentioned, this analysis of resources may account for initially-determined language and/or speaking abilities of the customer, or the analysis may simply involve searching for the next available agent or an agent that has been idle the longest.

Based on its analysis in step 316, the work assignment engine 120 makes a preliminary determination of the best agent to receive the work item (step 320) and assigns the work item to the selected agent (step 324). This initially-assigned agent is then connected with the customer (step 328). In particular, the work assignment engine 120 may instruct the routing engine 140 to connect the resource 112 operated by the agent with the communication device 108 being operated by the caller. At this point, the caller is capable of communicating with the agent and servicing of the work item can commence.

Figure 4:
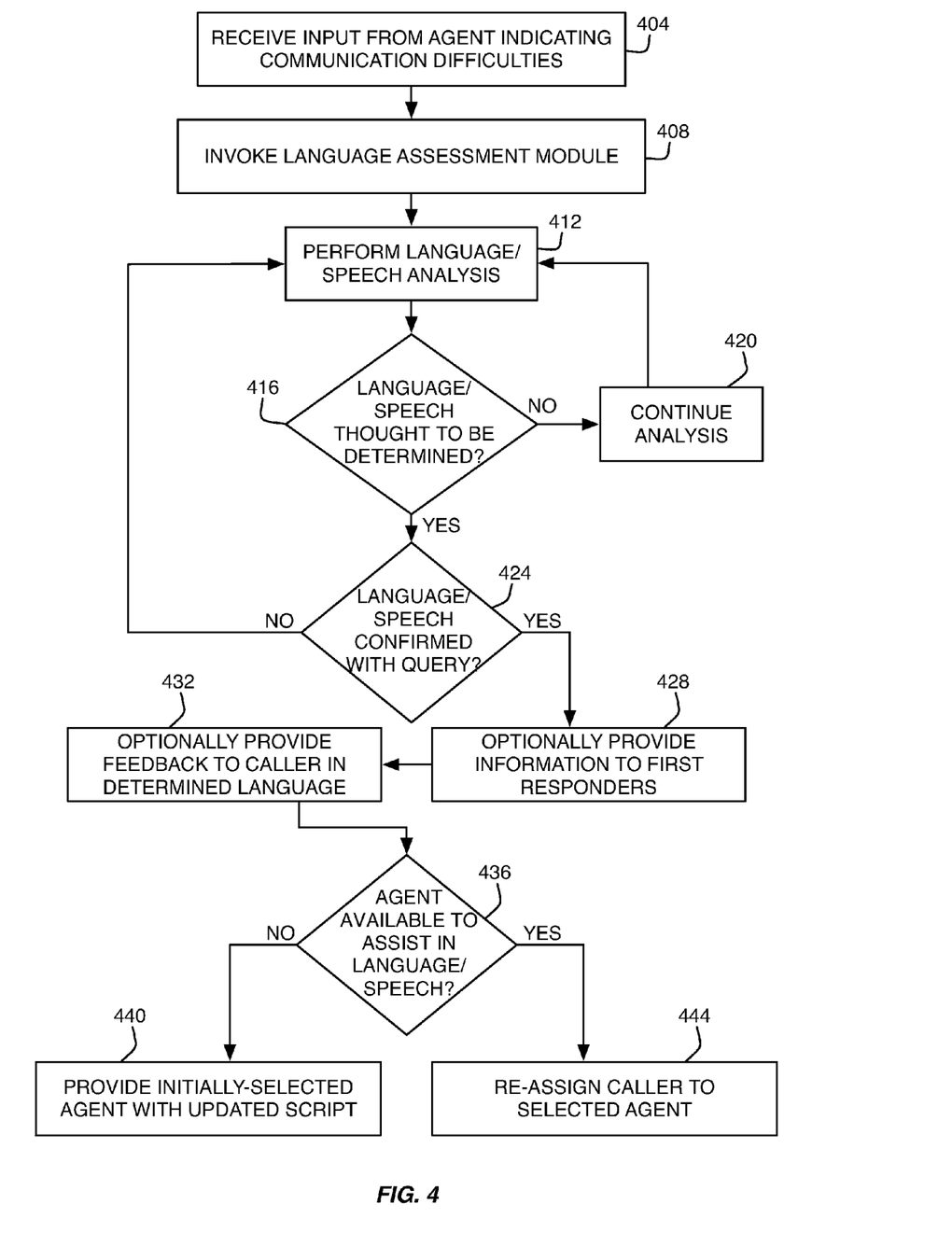
FIG. 4 is a flow diagram depicting a language/speech assessment method in accordance with embodiments of the present disclosure.

With reference now to FIG. 4, an illustrative language/speech assessment method will be described in accordance with embodiments of the present disclosure. The method begins when an input is received from an agent at the language assessment interface 128, where the input indicates that the agent is having communication difficulties with the caller (step 404). In response to receiving such an input from the agent, the language assessment module 124 is then invoked to begin a language/speech analysis process (steps 408 and 412). In particular, the language assessment module 124 may begin any number of different language/speech assessment processes depending upon the amount of information already known about the caller, the amount of additional information provided to the language assessment module by the agent, and the like. The language/speech analysis processes performed by the language assessment module 124 may be completely automated or may utilize inputs received from the caller and/or agent.

A couple of illustrative, but non-limiting, examples of a language/speech analysis process that may be performed will now be described. It should be appreciated that any of these processes could be combined or partially performed without departing from the scope of the present disclosure. As a first example, the background processes invoked by the language assessment module 124 during the initial phases of the interaction may have looked up the number supplied by Caller ID and the associated subscriber name, which is "Johann Schmitt" and address. Those details appear on the screen via the language assessment interface 128 as they are discovered. Queries into a Geographic Information System reveal that the address is in the "Little Germany" section of town, and queries into a name database reveal that the first name Johann is commonly associated with German speakers, as is the last name. The language assessment module 124, based on this information, may estimate that the caller is speaking German with a 60% probability. Perhaps an entry in the customer information database 136 also indicates that an emergency call several years ago from this number involved a person who spoke only German. Each one of these facts appears on the screen as it is learned, along with any hints suggestive of any other languages.

In another example, the language assessment module 132 may generate and send to the caller's device one or more images in a variety of languages. Thus, if it is known that the caller is calling from a smart phone, then it might be useful to send down images such as "Press here for SELECTED LANGUAGE" in a variety of languages.

In yet another example, as soon as it is clear that English isn't working and there is any guess for a well-known language, a simple IVR-like system is started in that language, always aided by the initially-selected agent who is monitoring the entire process and is able to use his experienced ear to note stress, distress and other critical sounds. The resulting discourse in German will here be represented in English: Do you speak German? If the relieved caller screams "Yes! Yes!" then the system might process that, or the agent might aid it with a clue on the screen such as "Ja (pronounced 'Yah') means Yes". If the voice analysis is unsuccessful, the system might try again: If you speak German, press 6.

As another example, assume that the caller is a native speaker of Hindi who speaks almost no English and attempts to call a friend in India (Country Code 91) who lives in Delhi (Area Code 11). The person forgets to dial the US exit code of 011, and dials just 91-11-<8-digit number>. The caller is then shocked to find himself speaking to a 911 Dispatcher who does not speak Hindi. The language assessment module 124 may analyze the fact that 911 calls from the location where the call is originating often are directed toward India and the language assessment module 124 may determine that the most probable language being spoken by the caller is Hindi.

As still another example, if the caller is deaf, then the language assessment module 124 may be configured to determine that the caller is deaf and can then alter the responses based on such a determination. Specifically, when people who have been deaf since birth or early childhood try to speak, the sound of their voice often has a distinct "accent" that has characteristics unlike that of any foreign accent. The language assessment module 124 may be configured to detect such an "accent", identify the caller as a deaf caller, and then alter the way that the PSAP responds to the deaf caller in an appropriate manner (e.g., by providing text or text plus voice instead of providing voice only responses to the caller).

After the language assessment module 124 has performed some amount of language/speech analysis, the language assessment module 124 determines if it has enough information to determine or guess the caller's language/speech capabilities with a reasonable degree of certainty (step 416). If this query is answered negatively, additional analysis is performed by the language assessment module 124 (step 420) and then the method returns to step 412.

If, on the other hand, the query of step 416 is answered affirmatively, the method proceeds with the language assessment module 124 (with or without the assistance of the agent) providing one or more queries to the caller to determine if the language/speech capabilities determined/guessed in step 416 can be confirmed (step 424). The confirmation of the caller's language/speech capabilities may be performed with any number of queries (e.g., text queries, verbal queries, image-based queries, combinations thereof, etc.). If the language/speech capabilities of the caller are not confirmed with the query, then the method returns to step 412.

Conversely, if the query of step 424 is answered affirmatively, the method proceeds by optionally providing the determined language/speech information to first responders en route to the location of the emergency (e.g., the location of the caller) (step 428). Alternatively or additionally, the caller may be provided with additional feedback to try and help soothe or relax the caller (step 432). If possible, the additional feedback may be provided in the confirmed language. Moreover, the additional feedback may be provided with any type or combination of messages.

The method then proceeds with the work re-assignment module 132 re-analyzing the resources 112 to determine if another resource/agent is available that can better match the language/speech speech preferences of the caller (step 436). If the work re-assignment module 132 determines that another agent is available with language capabilities that better meet the caller's needs, then the work re-assignment module 132 causes the work item to be re-assigned to the new agent and instructs the routing engine 140 to connect the caller with the new agent (step 444). If no such agent is available, then the agent that originally invoked the language assessment module 124 may be provided with updated scripts via the language assessment interface 128 (step 440). The script may enable the agent to assist the caller even though the agent is not proficient in the caller's preferred language.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method performed by a processor of servicing an emergency contact in a Public Safety Answering Point (PSAP) call center, the method comprising:

receiving a contact from a caller at a work assignment mechanism and generating a corresponding work item to represent the contact in the PSAP call center;

prior to assigning the work item to a first PSAP agent, performing a first language assessment process at a work assignment engine based on data sources associated with the caller stored in a customer information database, wherein the data sources are two or more of the following: location information for the caller, caller identification information, caller name information, phonetic information, customer history information, and language probabilities;

based on the first language assessment process, making a first probabilistic determination of an at least one of a language preference and requirement of the caller;

based on the first probabilistic determination of the at least one of a language preference and requirement of the caller, assigning the work item to a first PSAP agent who meets the at least one language preference and requirement;

during an interaction between the first PSAP agent and caller, determining that the at least one of a language preference and requirement of the caller is not completely satisfied by the first PSAP agent; and enabling the first PSAP agent to invoke a processor-executable language assessment module, the language assessment module providing the first PSAP agent with one or more tools to determine the at least one of a language preference and requirement of the caller.

2. The method of claim 1, further comprising:
performing a second language assessment processes, the second language assessment processes being configured to probe further the at least one of a language preference and requirement;
based on the second language assessment processes, making a second probabilistic determination of the at least one of a language preference and requirement of the caller; and
attempting to confirm with the caller whether the second probabilistic determination of the at least one of a language preference and requirement is accurate.

3. The method of claim 2, further comprising:
receiving confirmation from the caller that the probabilistic determination of the at least one of a language preference and requirement is accurate.

4. The method of claim 3, further comprising:
updating a script to the first PSAP agent, the updated script including information to assist the first PSAP agent to communicate with the caller.

5. The method of claim 3, further comprising:
selecting a second PSAP agent that is better suited to communicate with the caller than the first PSAP agent; and
transferring the caller from the first PSAP agent to the second PSAP agent.

6. The method of claim 1, further comprising:
determining that the caller is unable or unwilling to speak; and
providing the caller with additional information that is configured to calm the caller even though the caller is unable or unwilling to speak.

7. A non-transitory computer readable medium having stored thereon instructions that cause a computing system to execute a method of servicing a contact in a contact center, the instructions comprising:

instructions configured to receive a contact from a caller at a work assignment mechanism and generate a corresponding work item to represent the contact in the contact center;

instructions configured to perform a first language assessment process at a work assignment engine based on data sources associated with the caller stored in a customer information database, wherein the data sources are two or more of the following:
location information for the caller, caller identification information, caller name information, phonetic information, customer history information, and language probabilities;

instructions configured to, based on the first language assesment process, make a first probabilistic determination of an at least one of a language preference and requirement of the caller;

instructions configured to, based on the first probabilistic determination of the at least one of a language preference and requirement of the caller, assign the work item to a first agent;

instructions configured to, during an interaction between the first agent and caller, determine that the at least one of a language preference and requirement of the caller is not completely satisfied by the first agent; and instructions configured to enable the first agent to invoke a processor-executable language assessment module, the processor-executable language assessment module providing the first agent with one or more tools to determine the at least one of a language preference and requirement of the caller.

8. The computer readable medium of claim 7, wherein the instructions further comprise:
instructions configured to perform a second language assessment processes, the second language assessment processes being configured to probe the at least one of a language preference and requirement;
instructions configured to, based on the second language assessment processes, make a second probabilistic determination of the at least one of a language preference and requirement of the caller; and
instructions configured to attempt to confirm with the caller whether the second probabilistic determination of the at least one of a language preference and requirement is accurate.

9. The computer readable medium of claim 8, wherein the instructions further comprise:
instructions configured to receive confirmation from the caller that the probabilistic determination of the at least one of a language preference and requirement is accurate.

10. The computer readable medium of claim 9, wherein the instructions further comprise:
instructions configured to determine that the caller is deaf and, in response thereto, enhance communications with the caller to include a visual form of communication.

11. The computer readable medium of claim 9, wherein the instructions further comprise:
instructions configured to select a second agent that is better suited to communicate with the caller than the first agent; and
instructions configured to transfer the caller from the first agent to the second agent.

12. The computer readable medium of claim 7 wherein the instructions further comprise:
instructions configured to determine that the caller is unable or unwilling to speak; and instructions configured to provide the caller with additional information that is configured to calm the caller even though the caller is unable or unwilling to speak.

13. A contact center, comprising:
   a processor configured to execute programming instructions stored in memory; and
   memory comprising instructions that are executable by the processor, the instructions including:
      a work assignment instruction performed by a work assignment mechanism to receive a contact from a caller, generate a corresponding work item to represent the contact in the contact center, and assign the work item to a first agent based on a preliminary language assesment process based on data sources associated with the caller stored in a customer information database, wherein the data sources are two or more of the following: location information for the caller, caller identification information, caller name information, phonetic information, customer history information, and language probabilities; and
      a language assessment instruction performed by a processor-executable language assesment module to, during an interaction between the first agent and caller, determine that at least one of a language preference and requirement of the caller is not completely satisfied by the first agent, and, in response thereto, provide the first agent with one or more tools to determine the at least one of a language preference and requirement of the caller.

14. The contact center of claim 13, wherein the language assessment module is further configured to perform a secondary language assessment process that further probes the at least one of a language preference and requirement, and then based on the secondary language assessment process, make a probabilistic determination of the at least one of a language preference and requirement of the caller.

15. The contact center of claim 14, wherein the language assessment module is further configured confirm with the caller whether the probabilistic determination of the at least one of a language preference and requirement is accurate.

16. The contact center of claim 13, wherein the language assessment module is further configured to determine that the caller is unable or unwilling to speak.

17. The method of claim 1, wherein the data sources are sent from a mobile device in real time, the data sources are included in a header comprising one or more of the following: contact element, timestamp, status, and tuple umbrella element.

18. The method of claim 2, further comprising, sending one or more images to the caller's mobile device, wherein each image represents a query in the at least one of a language preference and requirement selected based on the second probabilistic determination.

19. The method of claim 3, further comprising:
   after receiving confirmation from the caller that the probabilistic determination of the at least one of a language preference and requirement is accurate, providing the confirmed at least one of a language preference and requirement to to first responders.

20. The instructions of claim 8, further comprising:
   instructions configured to receive data sources sent from the caller's mobile device in real time, the data sources are included in a header comprising one or more of the following: contact element, timestamp, status, and tuple umbrella element;
   instructions configured to send one or more images to the caller's mobile device, wherein each image represents a query in the at least one of a language preference and requirement selected based on the second probabilistic determination; and
   instructions configured to receive confirmation from the caller that the second probabilistic determination of the at least one of a language preference and requirement is accurate; and
   instructions configured to provide the confirmed at least one of a language preference and requirement to first responders.

* * * * *

UNITED STATES PATENT AND TRADEMARK OFFICE
CERTIFICATE OF CORRECTION

PATENT NO. : 9,167,090 B2  Page 1 of 1
APPLICATION NO. : 13/846243
DATED : October 20, 2015
INVENTOR(S) : Bentley et al.

It is certified that error appears in the above-identified patent and that said Letters Patent is hereby corrected as shown below:

In the claims

Column 17, line 22, claim 13, delete "assesment" and replace it with --assessment-- therein.

Signed and Sealed this
Twenty-fourth Day of May, 2016

Michelle K. Lee
*Director of the United States Patent and Trademark Office*